US012349688B1

(12) United States Patent
Mulica (10) Patent No.: US 12,349,688 B1
(45) Date of Patent: Jul. 8, 2025

(54) METHOD FOR CUTTING A CENTER-CUT BONE-IN TURKEY THIGH PART FROM A TURKEY THIGH

(71) Applicant: Walter Mulica, Elk Grove, IL (US)

(72) Inventor: Walter Mulica, Elk Grove, IL (US)

( * ) Notice: Subject to any disclaimer, the term of this patent is extended or adjusted under 35 U.S.C. 154(b) by 0 days.

(21) Appl. No.: 18/631,021

(22) Filed: Apr. 9, 2024

(51) Int. Cl.
A22C 21/00 (2006.01)

(52) U.S. Cl.
CPC ...... *A22C 21/0076* (2013.01); *A22C 21/0023* (2013.01); *A22C 21/0092* (2013.01)

(58) Field of Classification Search
CPC . A22B 5/0029; A22B 5/0035; A22C 17/0006; A22C 17/004; A22C 21/0023; A22C 21/0076
USPC .......................... 452/135, 137, 149
See application file for complete search history.

(56) References Cited

U.S. PATENT DOCUMENTS

| | | | | |
|---|---|---|---|---|
| 3,036,922 A | * | 5/1962 | Saverslak | A22C 21/0092 426/652 |
| 3,594,189 A | * | 7/1971 | Panattoni | A22C 21/0069 426/104 |
| 5,273,483 A | * | 12/1993 | Gagliardi, Jr. | A23L 13/55 452/155 |
| 5,667,436 A | * | 9/1997 | Gagliardi, Jr. | A22C 17/0006 452/149 |
| 6,238,281 B1 | * | 5/2001 | Gagliardi, Jr. | A22C 21/0084 452/149 |
| 6,939,217 B2 | * | 9/2005 | Gagliardi, Jr. | A22C 21/0023 452/149 |
| 7,008,313 B2 | * | 3/2006 | Gagliardi, Jr. | A22C 17/04 426/480 |
| 7,175,517 B1 | * | 2/2007 | Weakley | A22C 21/0069 452/149 |
| 9,820,494 B2 | * | 11/2017 | Smith | A22C 21/0076 |
| 10,561,152 B1 | * | 2/2020 | Engel | A23L 13/50 |

* cited by examiner

*Primary Examiner* — David J Parsley
(74) *Attorney, Agent, or Firm* — Steven Ivy P.C.

(57) ABSTRACT

The present invention is a method for cutting a turkey thigh. The method involves skinning the thigh to reveal uniform meat texture on the top part and uneven meat texture indicative of the bottom part. Next, four cuts are made at predetermined locations. These cuts include two longitudinal cuts, made with a handheld knife, designed to create left and right boneless turkey thigh parts; and two transverse cuts, made with a band saw, designed to form top and bottom turkey thigh parts, which contain the femur's proximal and distal ends respectively. Key parameters are applied to ensure accurate cut locations, such as distances from the center of the femur bone, are used for the longitudinal cuts; and distances from visually established top and bottom lines, are used to make transverse cuts. The application of the method results in the creation of the center-cut bone-in turkey thigh part.

15 Claims, 14 Drawing Sheets

TURKEY THIGH
BOTTOM SKINLESS
MEAT PART

METHOD FOR CUTTING A CENTER-CUT BONE-IN
TURKEY THIGH PART FROM A TURKEY THIGH

METHOD FOR CUTTING A CENTER-CUT BONE-IN TURKEY THIGH PART FROM A TURKEY THIGH

FIELD OF THE INVENTION

The present invention pertains to the broader field of food processing, with a specific focus on poultry processing.

BACKGROUND OF THE INVENTION

Turkey is widely cherished as one of the most favored foods and a crucial component of holiday meals in the USA. The value of turkey production in 2022 soared to $7.10 billion, marking a remarkable 21 percent increase from the previous year's $5.89 billion. Furthermore, turkey meat production in the United States during January to September 2023 surged to 4.11 billion pounds, reflecting a notable uptick of approximately 5 percent compared to the preceding year.

This widespread popularity has led numerous food producers to compete for their share of the market by seeking to differentiate their products. While large, well-established producers can rely on their brand recognition and consumer loyalty to some degree, smaller meat processors and producers must explore alternative, more inventive approaches to attract consumers. One such strategy involves slicing turkey meat into lesser-known parts, presenting a novel way to capture consumer interest and diversify product offerings.

In fact, turkey is often segmented and packaged into parts such as fresh or frozen turkey breast, drumsticks, thighs, and wings, which are readily available in supermarkets. Among these sections, the turkey breast stands out as the largest. Due to its size, it can be further sliced into smaller cutlets, steaks, tenderloins, which are thinly sliced for convenience. These parts are typically boneless and skinless, weighing between 6 to 12 ounces, and are widely sought after by consumers. Other turkey parts, such as wings or drumsticks, can also be purchased either as a whole component or in sections.

Turkey thighs, although less common, are considered an alternative choice due to their darker meat. Dark meat is known for its richer flavor and juiciness, appealing to some consumers for its distinct texture and taste. Positioned above the knee joint, turkey thighs are marketed bone-in or boneless, with or without skin. Bone-in thighs with skin are typically available in weights ranging from half a pound to a pound and a half, offering customers a variety of options.

Distinguishing between producers of such turkey meat can be challenging, with differentiation typically relying on the producer's name rather than the meat's structure. However, the president invention introduces a method that generates a unique center-cut bone-in turkey thigh part. This turkey part is a sliced turkey thigh resembling pork or beef ribs, and just like ribs this turkey part contains a bone nestled within tender meat.

This method involves cutting the turkey thigh in a way that leaves a portion of rich, dark meat surrounding a femur bone. Two vertical cuts are made on both sides of the femur bone to remove sections of meat, while two additional horizontal cuts shorten the bone, removing its proximal and distal ends. The result is the center-cut bone-in turkey thigh part. It features a thick section of dark meat with a portion of the femur bone inside, visually resembling traditional pork or beef rib sections.

BRIEF SUMMARY OF THE INVENTION

The following information is intended to be a brief summary of the invention, and as such, said information shall not be used as the means of limiting the scope of the invention:

The present invention discloses a method for processing and cutting a turkey thigh, titled "Method for Cutting a Center-Cut Bone-In Turkey Thigh Part From a Turkey Thigh" (center-cut turkey). The process begins with providing a turkey thigh with a femur bone severed at two ends, including a proximal and a distal end. The thigh is then skinned, distinguishing a top skinless meat part with a uniform texture from a bottom skinless meat part exhibiting an uneven texture due to tendons, ligaments, and the femur bone. Next, the turkey thigh is placed on a cutting surface, allowing the meat cutter to visually discern the tendons, ligaments, and femur bone. A centerline of the femur bone, a top line, and a bottom line of the turkey thigh are identified. A cutting tool, such as a knife, is provided for the meat cutter to use. The first cut is made longitudinally and parallel to the centerline, creating a left boneless turkey thigh part. Similarly, the second cut is made on the opposite side of the centerline, generating a right boneless turkey thigh part. Both of these cuts are made at a predetermined distance from the center line (approximately 2-2.5 inches). Next, the remaining components of the turkey thigh are transferred onto a band saw. Here, the transverse cuts are made at predetermined distances from the top and bottom lines (approximately 1-2 inches). The third cut creates a top turkey thigh part (containing the proximal end of the femur bone), and the fourth cut creates a bottom turkey thigh part (containing the distal end of the femur bone). If the meat cutter observes that the provided measurements and the location of the third and fourth cuts will not generate the desired results, ad hoc adjustments can be made to ensure that the proximal and distal ends of the femur bone are entirely located within their respective thigh parts. Finally, upon completion of the cuts, the left and right boneless turkey thigh parts, along with the top and bottom turkey thigh parts, are separated from the remaining meat portion, which constitutes the center-cut bone-in turkey thigh part.

BRIEF DESCRIPTION OF THE DRAWINGS

The components shown in the drawings are not to scale. In the interest of clarity, some of the components might be shown in a generalized form and could be identified utilizing commercial designations. All components, including its essential features, have been assigned reference numbers that are utilized consistently throughout the descriptive process outlined herein:

FIG. 4 depicts two illustrations of the turkey thigh; the first illustration showcases the top skinless meat part, while the second illustration presents the bottom skinless meat part; both illustrations display the thigh after the skinning process, just before the cutting procedure begins; the top illustration reveals the top skinless meat part, distinguished by its uniform meat texture; in contrast, the bottom illustration exhibits the bottom skinless meat part, characterized by an uneven meat texture due to the presence of tendons and ligaments; a centerline is visible in both figures, loosely following the center of the femur bone; this centerline serves as a reference point for determining the locations of the first and second cuts mentioned in subsequent drawings; in accordance with an exemplary embodiment of the present invention.

FIG. 5 illustrates the turkey thigh, emphasizing the bottom skinless meat part characterized by an uneven meat texture due to the presence of tendons and ligaments, as well as the protruding femur bone with its proximal and distal ends; using broken lines, the illustration outlines the locations of all four cuts necessary to produce the center-cut bone-in turkey thigh part; specifically, the illustration highlights the centerline, loosely following the center of the femur bone, serving as a reference point for determining the location of the first cut (which creates the left boneless turkey thigh part), and the location of the second cut (which generates the right boneless turkey thigh part); additionally, the illustration delineates the location of the top line used to determine the position of the third cut (generating the top turkey thigh part), and the location of the bottom line, which serves as a reference point for generating the fourth cut (creating the bottom turkey thigh part); in accordance with an exemplary embodiment of the present invention.

FIG. 6 illustrates the turkey thigh, emphasizing the bottom skinless meat part characterized by an uneven meat texture due to the presence of tendons and ligaments, as well as the protruding femur bone with its proximal and distal ends; using broken lines, the illustration outlines the locations of all four cuts necessary to produce the center-cut bone-in turkey thigh part; specifically, the illustration highlights the centerline, loosely following the center of the femur bone, serving as a reference point for determining the location of the first cut, the location of the second cut; additionally, the illustration delineates the location of the top line used to determine the position of the third cut, and the location of the bottom line, which serves as a reference point for generating the fourth cut; moreover, in enclosed boxes and slightly separated from each other, the illustration shows the configuration of all five thigh parts, (1) namely the left boneless turkey thigh part, (2) the right boneless turkey thigh part, (3) the top turkey thigh part, (4) the bottom turkey thigh part, (5) center-cut bone-in turkey thigh part, generated after completion of the four cuts; in accordance with an exemplary embodiment of the present invention.

FIG. 10 depicts the turkey breast following the completion of the first and second cuts, where two pieces resulting from these cuts have been removed, specifically the left boneless turkey thigh part and the right boneless turkey thigh part; this leaves the portion of the turkey thigh containing the femur bone, along with its proximal (hip joint) and distal (knee joint) ends; here, the remaining part is placed on the band saw (identified herein as a cutting tool) where the meat cutter will execute the third cut; the third cut will generate the top turkey thigh part containing the proximal end of the femur bone; using the same method, the meat cutter performs a fourth cut, which will generate the bottom turkey thigh part containing the distal end of the femur bone; in accordance with an exemplary embodiment of the present invention.

DESCRIPTIVE KEY METHOD FOR CUTTING A CENTER-CUT BONE-IN TURKEY THIGH PART FROM A TURKEY THIGH ("CURRENT METHOD")

01—turkey thigh
02—femur bone
03—proximal end (hip joint)
04—distal end (knee joint)
05—top skinless meat part
06—uniform meat texture
07—bottom skinless meat part
08—uneven meat texture
09—tendons and ligaments
10—surface (meat cutting board)
11—meat cutter (person)
12—center line
13—top line
14—bottom line
15—cutting tool (knife, automated knife, band saw or bandsaw)
16—first cut (location of the first cut)
17—second cut (location of the second cut)
18—third cut (location of the third cut)
19—fourth cut (location of the third cut)
20—left boneless turkey thigh part
21—right boneless turkey thigh part
22—top turkey thigh part
23—bottom turkey thigh part
24—center-cut bone-in turkey thigh part

DETAILED DESCRIPTION OF THE PREFERRED EMBODIMENT

Figure 1:
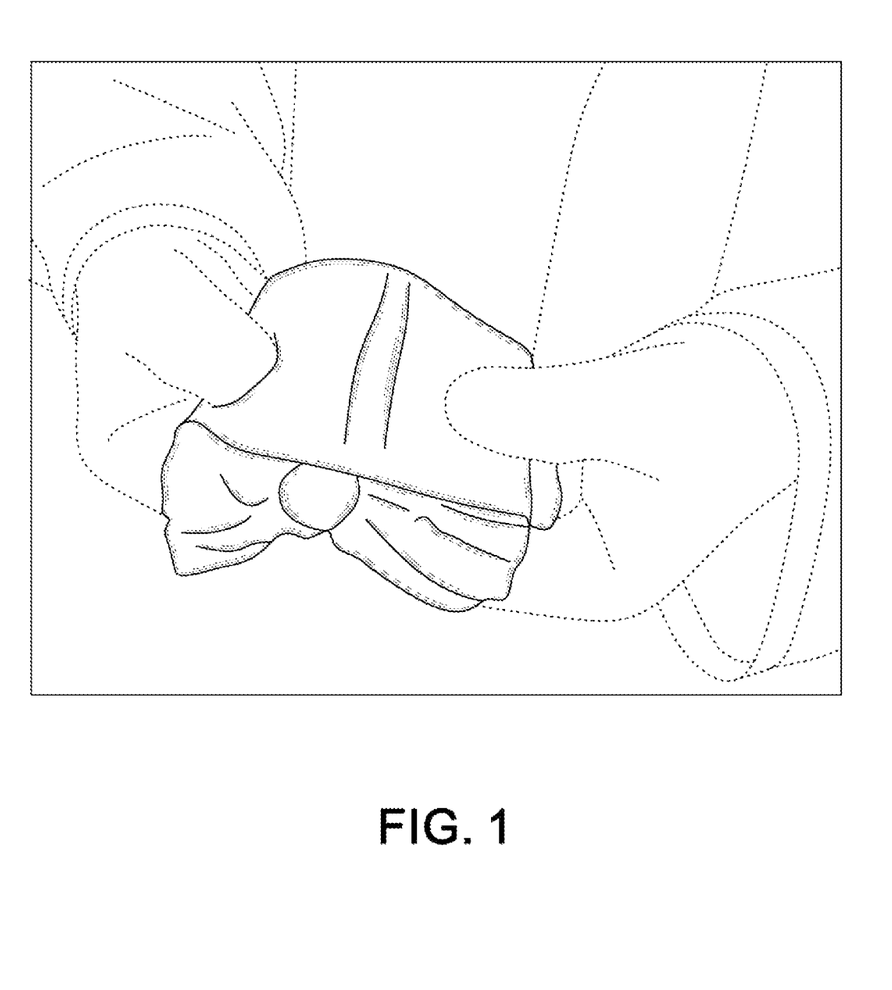
FIG. 1 is a perspective view of the present invention titled Method for Cutting a Center-Cut Bone-In Turkey Thigh Part From a Turkey Thigh; more specifically, the figure depicts the center-cut bone-in turkey thigh part (revealing the skinless meat part with uniform meat texture) created after four specific cuts have been completed; in accordance with an exemplary embodiment of the present invention.
Figure 2:
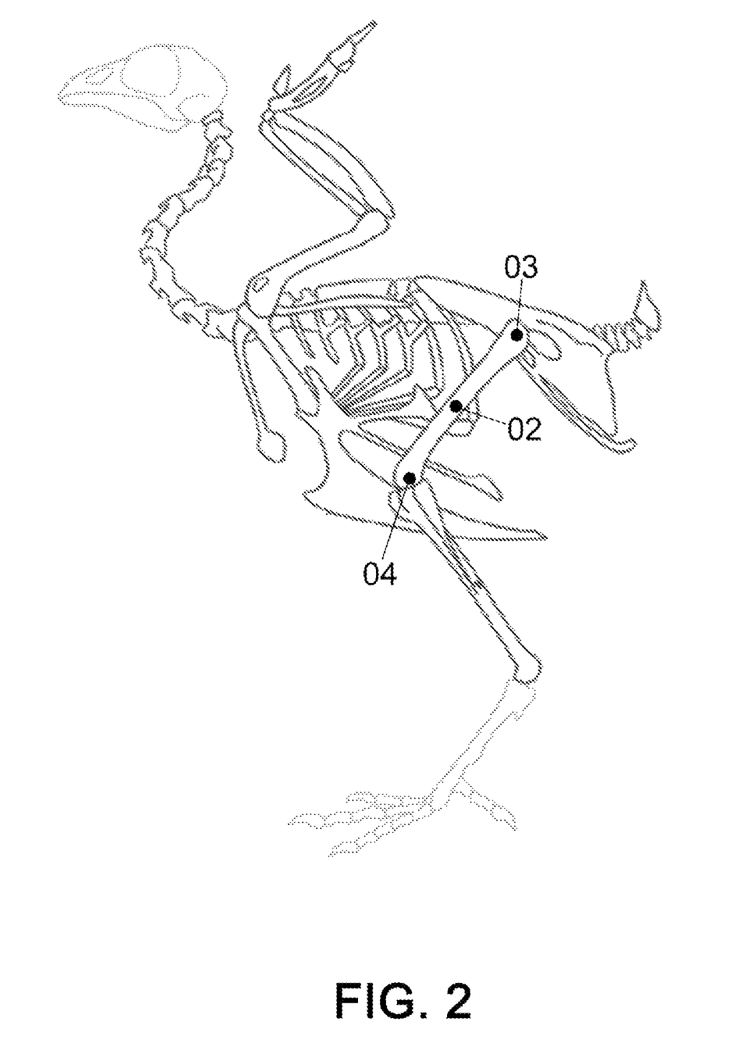
FIG. 2 depicts the skeletal structure of a turkey, focusing on the location of the turkey thigh, which is the subject of the present invention; the figure highlights the bone structures within the thigh, specifically showing the femur bone; additionally, it outlines the positioning of the proximal end of the femur, also known as the hip joint, and the distal end, referred to as the knee joint; according to the method presented herein, the thigh will undergo four cuts to produce four meat parts and a primary component identified as a single center-cut bone-in turkey thigh part.

The following description references to the above-defined drawings and represents only an exemplary embodiment of the invention. It is foreseeable, and recognizable by those skilled in the art, that various modifications and/or substitutions to the invention could be implemented without departing from the scope and the character of the invention:

The present invention teaches a method for cutting out a center-cut bone-in turkey thigh part (24), shown in FIG. 1, from a turkey thigh (01). The method involves the following steps:

Providing the Turkey Thigh: The process begins with obtaining a turkey thigh (01) that has a femur bone (02) severed at two ends, consisting of a proximal end (03) and a distal end (04). FIG. 2 outlines the positioning of the proximal end (03) of the femur, also known as the hip joint, and the distal end (04), referred to as the knee joint within the turkey's skeleton.

Figure 3:
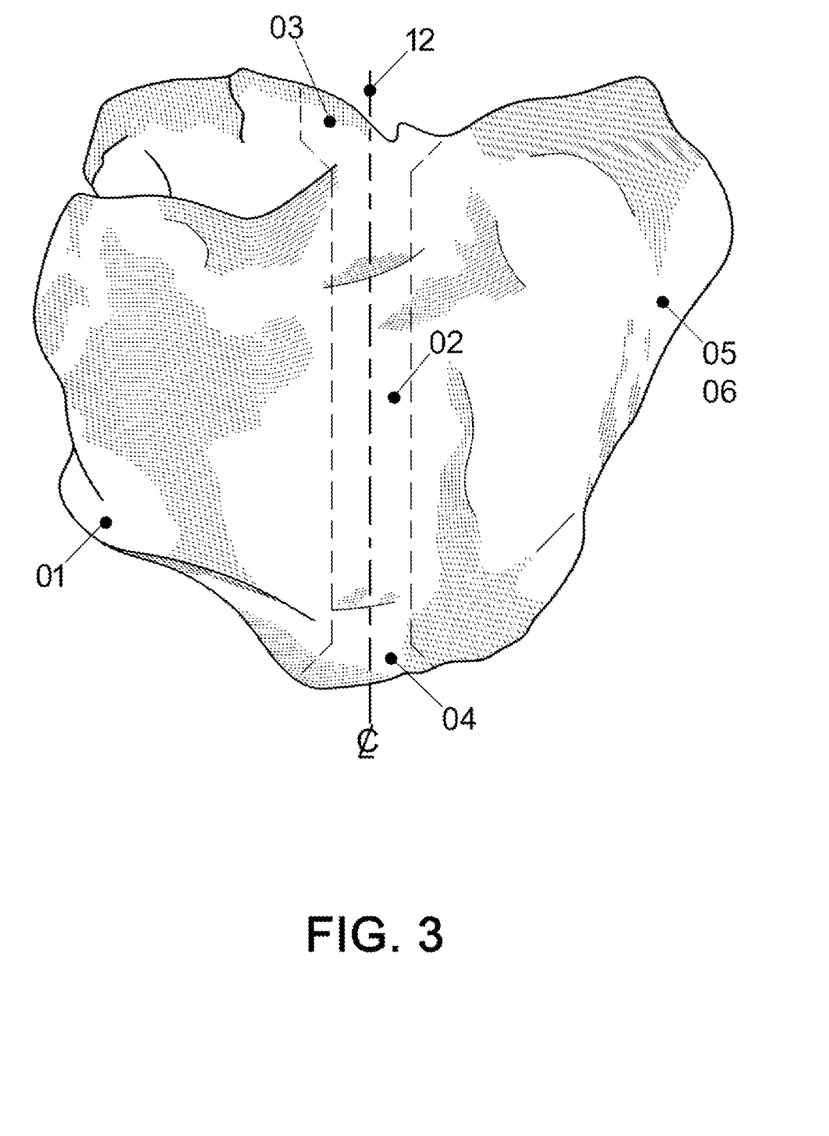
FIG. 3 provides a top view of a turkey thigh, specifically illustrating the thigh post-skinning processes; using broken lines, the figure indicates the location of the proximal end (or the hip joint), the distal end (or the knee joint), and the interconnecting femur bone; the figure also displays the centerline (loosely following the center of the femur bone) which serves as a reference point for determining the locations of the first and second cuts referenced in subsequent drawings; additionally, this view of the turkey thigh shows the top skinless meat part, characterized by its uniform meat texture; in accordance with an exemplary embodiment of the present invention.
Figure 4:
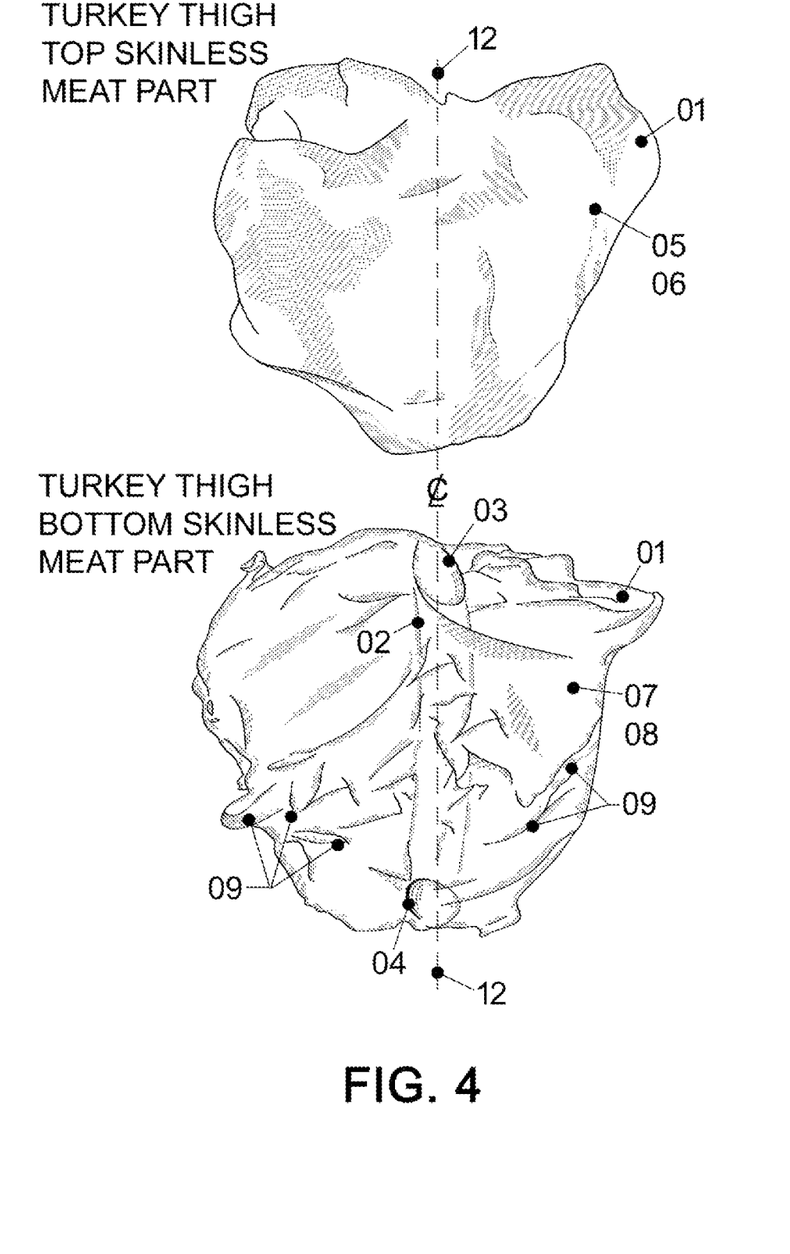

Skinning the Turkey Thigh: The turkey thigh (01) is skinned to expose the meat. As shown in FIG. 3, the top skinless meat part (05) of the thigh is identified by a uniform meat texture (06), while the bottom skinless meat part (07) shows an uneven texture (08), indicating the presence of tendons and ligaments (09) and the femur bone (02). The two textures are compared in FIG. 4. Here, two illustrations are presented, the first illustration showcases the top skinless meat part (05), while the second illustration presents the bottom skinless meat part (07). The top illustration reveals that the top skinless meat part (05) is distinguished by its uniform meat texture (06), while the bottom illustration reveals that the bottom skinless meat part (07) is characterized by an uneven meat texture (08) due to the presence of tendons and ligaments (09).

Figure 8:
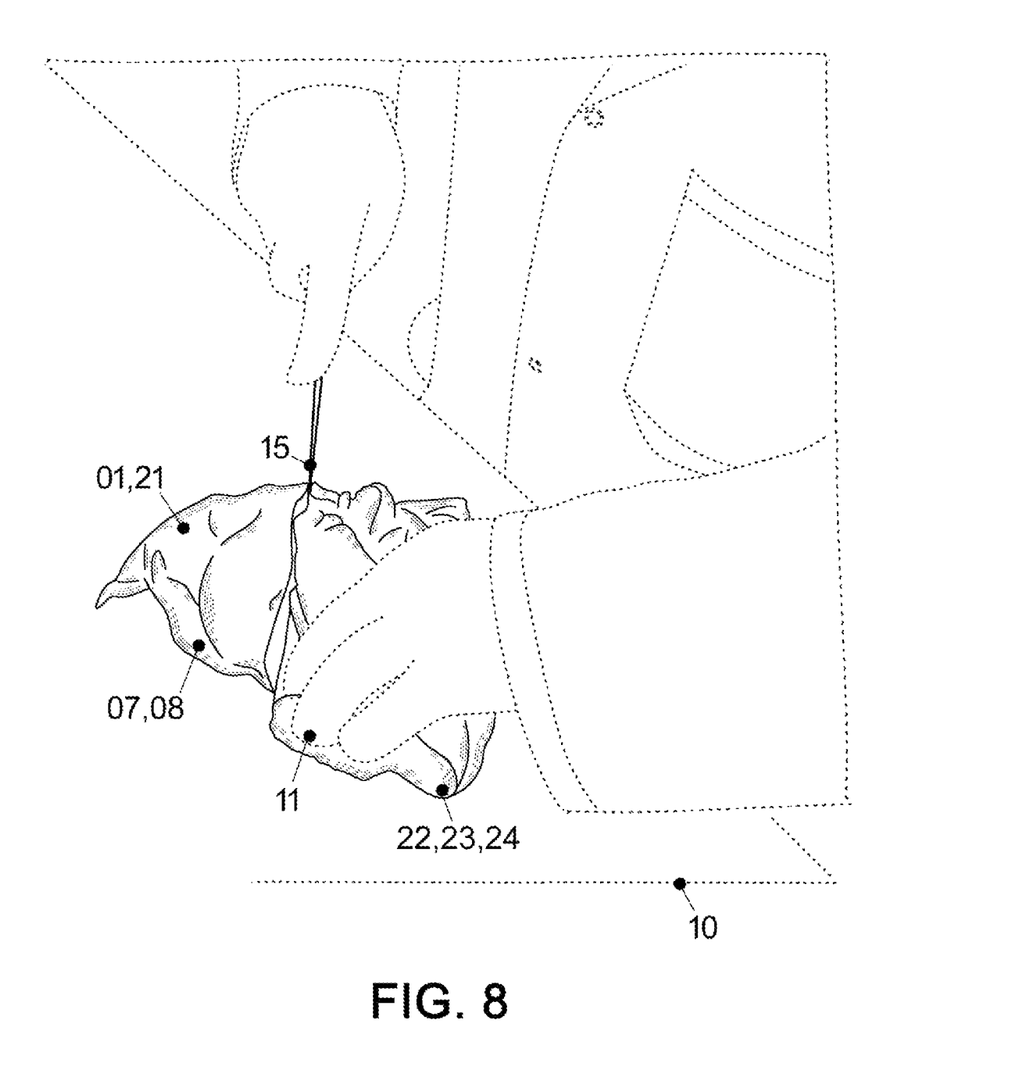
FIG. 8 shows the meat cutter performing the second cut of the turkey thigh using a cutting tool (i.e., handheld knife); this view exposes the bottom skinless meat part of the thigh, identifiable by an uneven texture due to the presence of tendons, ligaments, and the protruding femur bone, which is used to visually and quickly assess the location of the second cut; this cut creates the right boneless turkey thigh part; in accordance with an exemplary embodiment of the present invention.

Placing the Turkey Thigh on the Cutting Surface: Once the skin is removed from the turkey tight (01), allowing for visual inspection of the meat, the tight (01) is places on a surface (10), commonly known as a cutting board, shown in FIGS. 8-9. The use of the cutting board (10) is critical, as it prevents cross-contamination between different foods, and provides a stable and clean surface for slicing, chopping, and preparing meat. Here, the turkey thigh is placed on the cutting board (10), with the top skinless meat part (05) touching the board (10), and the bottom skinless meat part (07) being open to visual inspection by a meat cutter (11).

Figure 5:
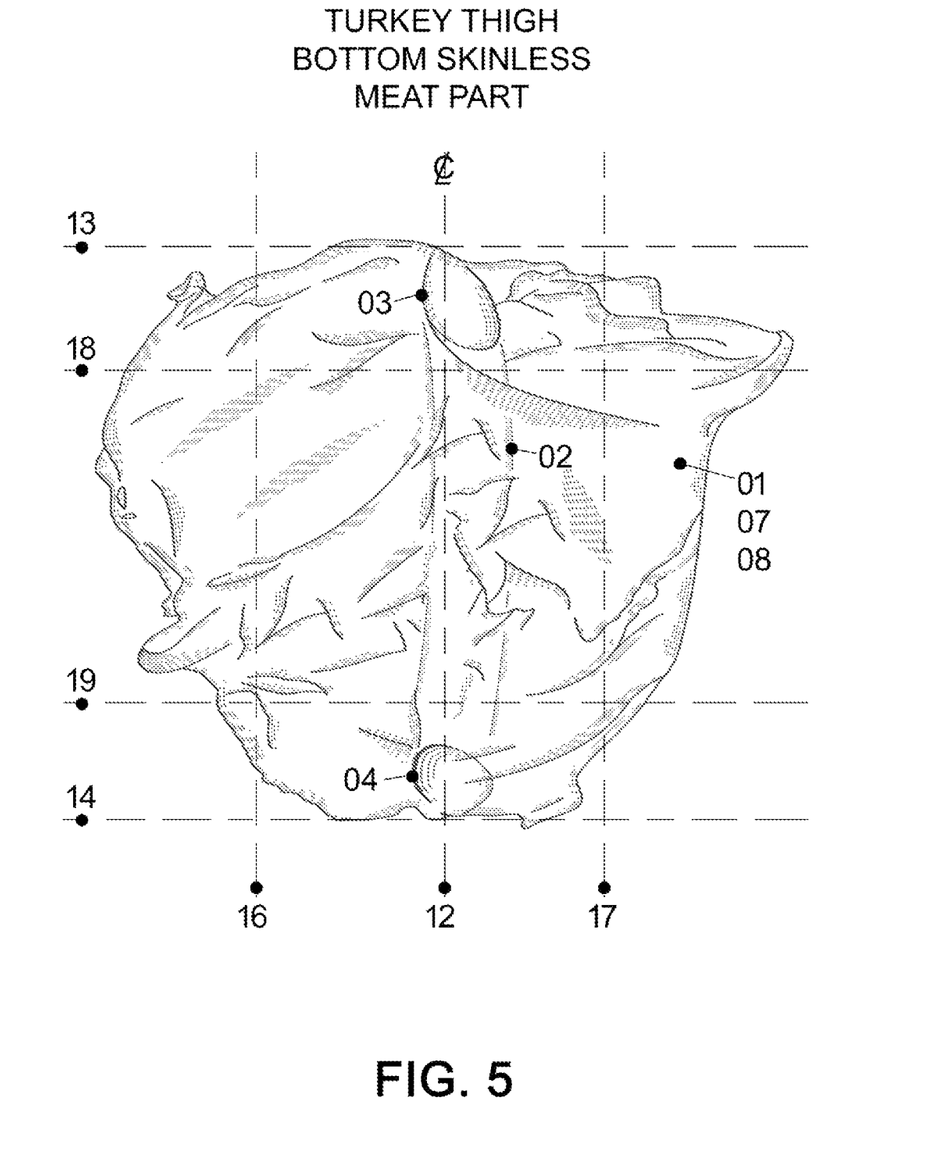

Identifying the Cutting Locations: Upon placing the turkey thigh (01) on the cutting board (10), it is crucial to pinpoint precisely where the cuts will be made. To accomplish this, the meat cutter (11) must inspect the meat surface. In this instance, it is the bottom skinless meat part (07) with an uneven texture (08), characterized by the presence of tendons and ligaments (09), where the femur bone (02) may be identifiable in its center. Initially, the center line (12) of the femur bone (02) must be established, followed by identifying the top line (13) of the turkey thigh (01), as shown in FIG. 5. Positioned at the highest point of the thigh (01), this line marks the uppermost end of the turkey thigh (01). Similarly, a bottom line (14) must be identified, delineating the lowermost end of the turkey thigh (01). These lines serve to outline the placement of longitudinal or vertical cuts, as well as the locations of transverse or horizontal cuts, which will occur in subsequent steps.

Providing a Cutting Tool: A cutting tool (15), such as a knife, automated knife, scissors, or band saw, is provided to the meat cutter (11), which will be used to make precise cuts through the turkey thigh (01).

Figure 6:
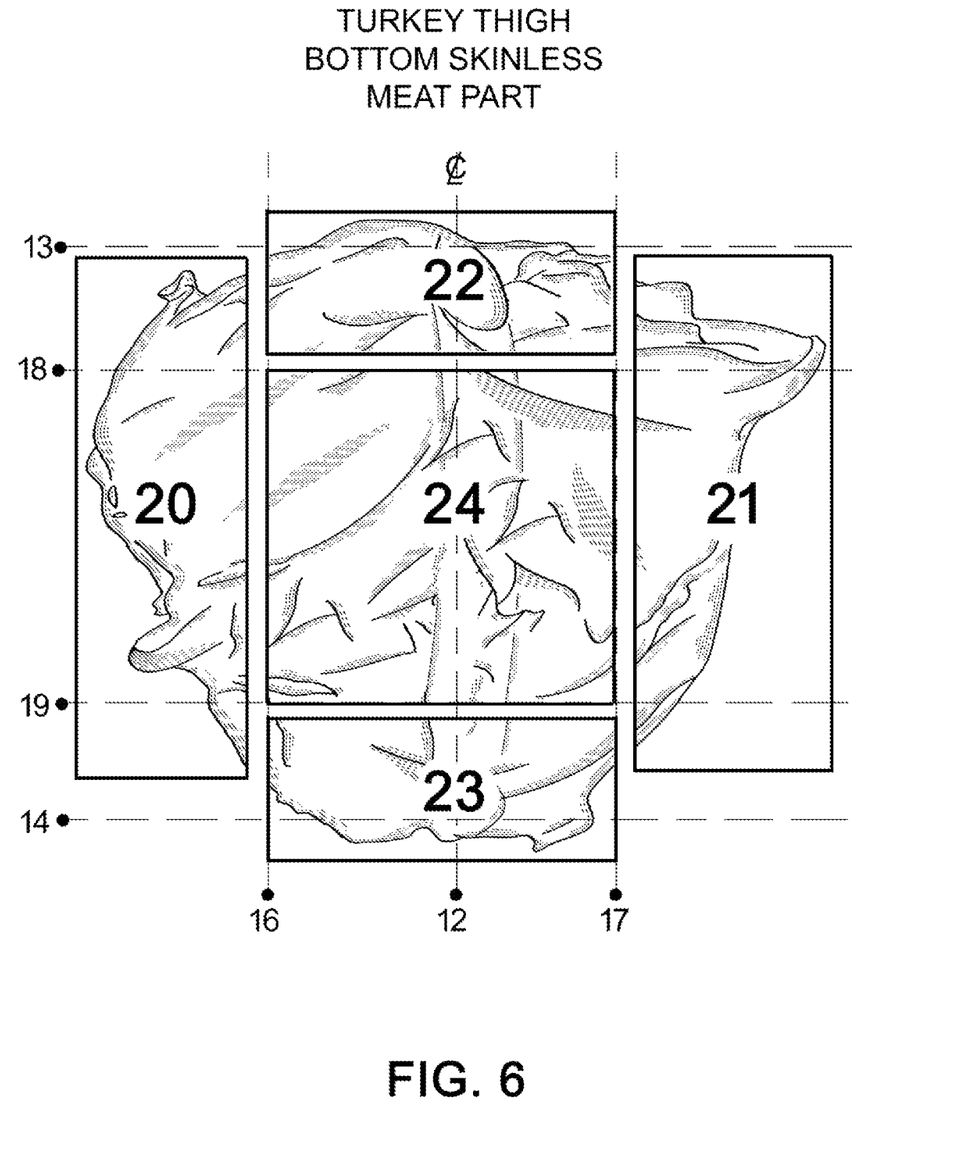
Figure 7:
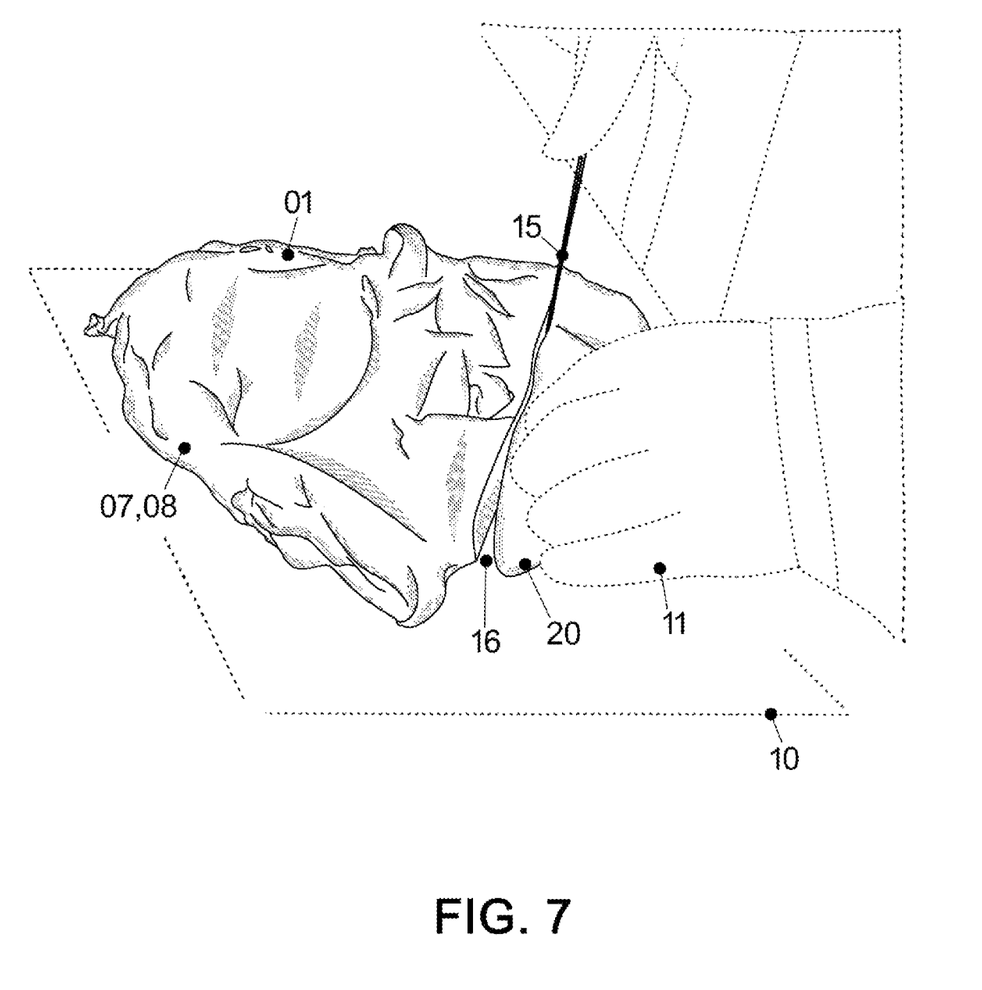
FIG. 7 shows the meat cutter performing the first cut of the turkey thigh using a cutting tool (i.e., handheld knife); this view exposes the bottom skinless meat part of the thigh, identifiable by an uneven texture due to the presence of tendons, ligaments, and the protruding femur bone, which is used to visually and quickly assess the location of the first cut; this cut creates the left boneless turkey thigh part; in accordance with an exemplary embodiment of the present invention.
Figure 9:
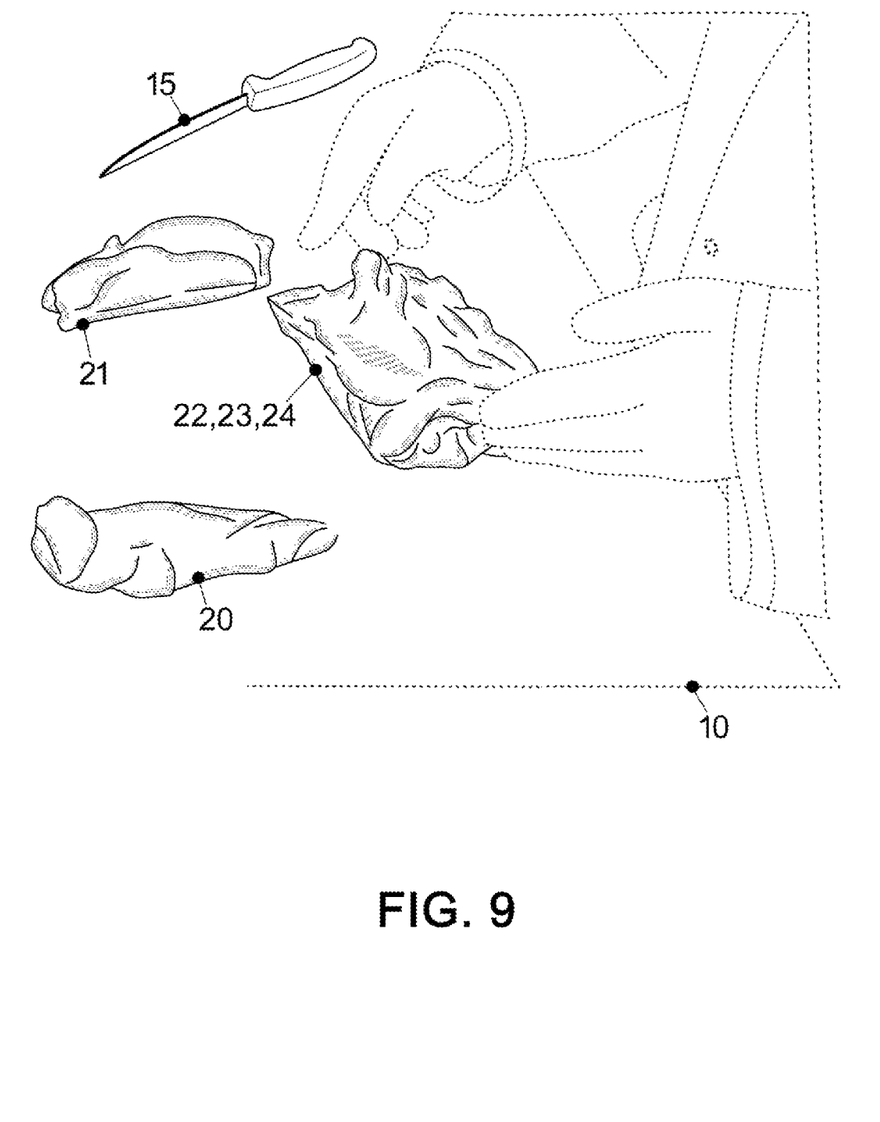
FIG. 9 shows the turkey breast immediately after the completion of the first and the second cuts; the first cut created the left boneless turkey thigh part, and the second cut created the right boneless turkey thigh, which in this illustration are shown separated from the remaining part of the turkey thigh; the remaining turkey thigh will be cut two more times, and this action will generate the top turkey thigh part, the bottom turkey thigh part, and center-cut bone-in turkey; in accordance with an exemplary embodiment of the present invention.

Creating Longitudinal Cuts: Illustrated in FIGS. 7-8, using the cutting tool (15), which, in this step, is a manually-operated knife, the meat cutter (11) executes two longitudinal cuts parallel to the center line (12). The initial cut (16), depicted in FIGS. 5 and 6, is made leftward of the center line (12) at a predetermined distance, resulting in the formation of a left boneless turkey thigh part (20). Subsequently, the second cut (17) is performed to the right of the center line, also at a predetermined distance, leading to the creation of a right boneless turkey thigh part (21). FIG. 9 shows the both (20,21) boneless turkey parts separated from the remaining turkey thigh (01). Although the precise distances from the center line for these cuts are not specified, they are determined by the meat cutter upon visually inspecting the turkey thigh immediately before the cutting process. Nevertheless, upon assessing standardized sizes on turkey thighs, it has been established that these distances typically range from 2 to 2.5 inches.

Figure 10:
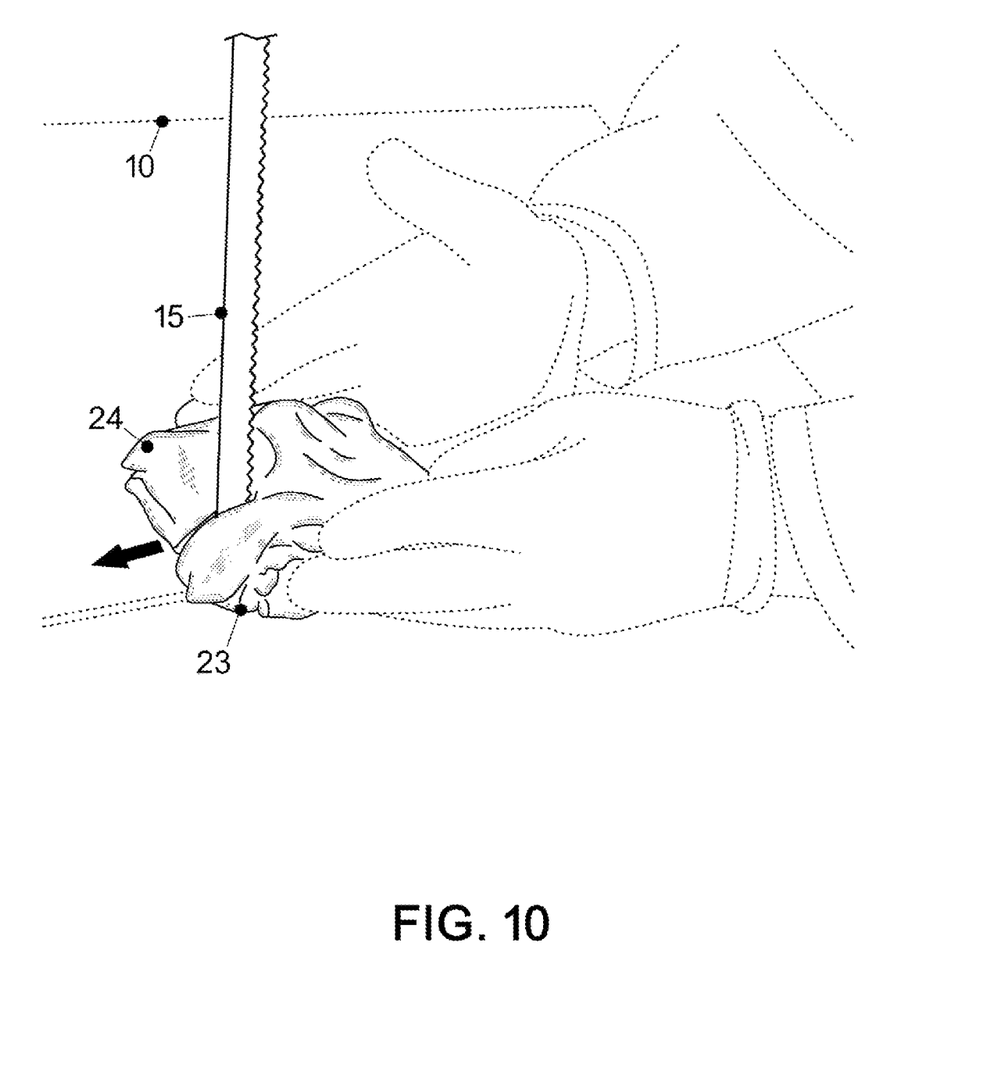

Performing Transverse Cuts: Illustrated in FIG. 10, the meat cutter (11) proceeds to make two transverse cuts perpendicular to the longitudinal cuts, as demonstrated in FIGS. 5 and 6. The third cut (18) is initiated at a predetermined distance from the top line (13), resulting in the creation of a top turkey thigh part (22). Enclosed within the top turkey thigh part (22) lies the proximal end (03) of the femur bone (02). Subsequently, the fourth cut (19) is carried out at a predetermined distance from the bottom line (14), yielding a bottom turkey thigh part (23). Similar to the third cut (18), the bottom turkey thigh part (23) encompasses the distal end (04) of the femur bone (02). Both of these transverse cuts are executed using a bandsaw (15). Although other cutting tools can perform these cuts, bandsaws are commonly employed for such operations due to their ability to provide swift and precise cutting through bones and large meat pieces. The predetermined distance for these cuts can be visually assessed by the meat cutter (11), ensuring that the distal (04) and proximal (03) ends remain fully enclosed within the newly formed pieces—the top turkey thigh part (22) and the bottom turkey thigh part (23). Nevertheless, upon evaluating standardized sizes on turkey thighs, it has been determined that these distances from the top (13) and bottom (14) lines typically range from 1 to 2 inches.

Figure 11:
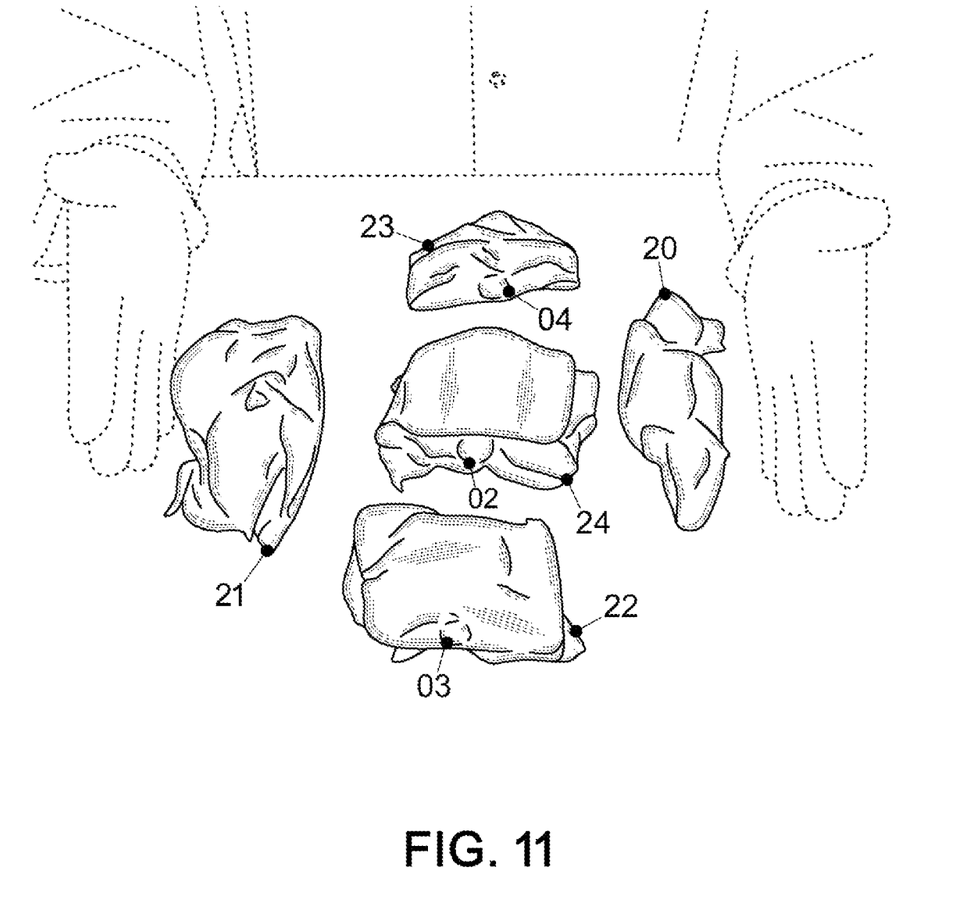
FIG. 11 displays all five turkey breast parts resulting from the described four cuts, arranged on the cutting surface; more specifically, the figure exhibits the left boneless turkey thigh part, the right boneless turkey thigh part, the top turkey thigh part, the bottom turkey thigh part, and the center-cut bone-in turkey thigh part; here, each part is positioned proximately to its location before the cuts were completed; in accordance with an exemplary embodiment of the present invention.

Once the aforementioned longitudinal and transverse cuts are executed, five distinct pieces of meat are formed as delineated in FIGS. 6 and 11. These meat sections comprise the left boneless turkey thigh part (20), the right boneless turkey thigh part (21), the top turkey thigh part (22), the bottom turkey thigh part (23), and the center-cut bone-in turkey thigh part (24).

Figure 12:
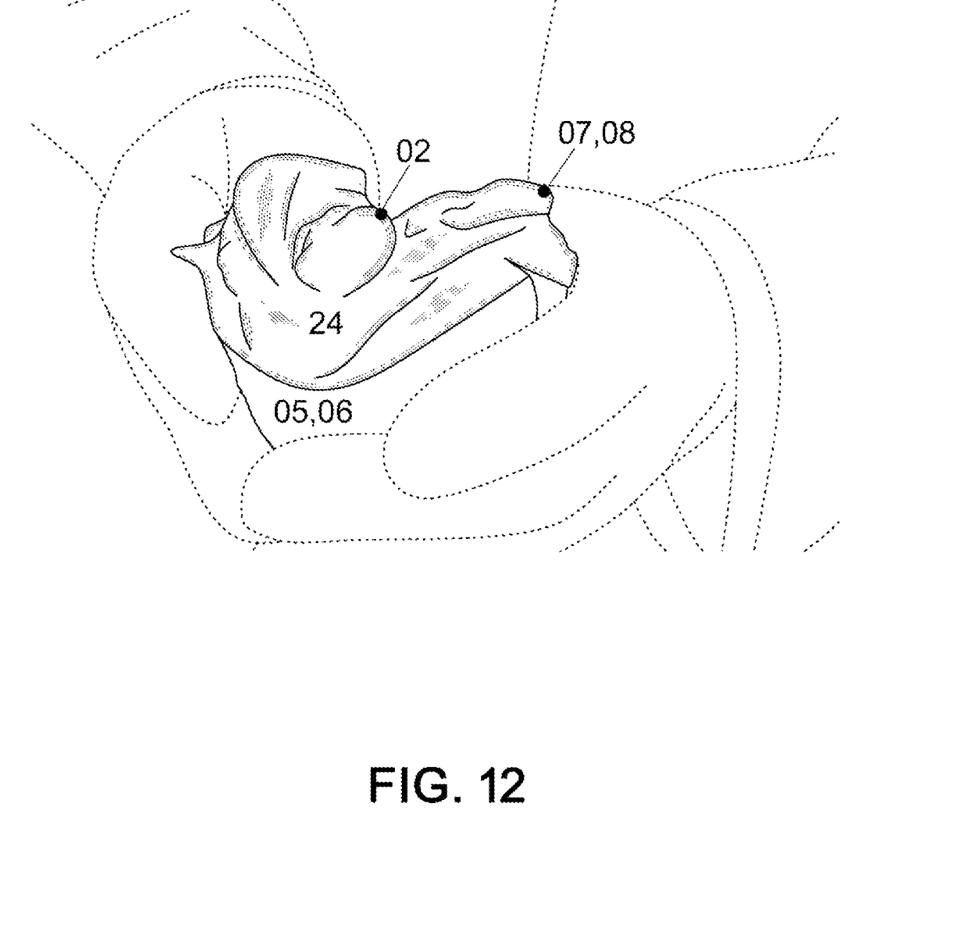
FIG. 12 depicts a side view of the center-cut bone-in turkey thigh part, with the femur bone transversely sliced; the center-cut bone in a turkey thigh part held by the meat cutter (person cutting the turkey thigh), offering a clear depiction of its proportions; partially visible is the top skinless meat part, distinguished by its uniform meat texture; the center-cut bone in turkey thigh part represents the end result of the current method, which requires two longitudinal (vertical) cuts and two transverse (horizontal) cuts, each made at predetermined locations utilizing a handheld knife and a bandsaw; in accordance with an exemplary embodiment of the present invention.
Figure 13:
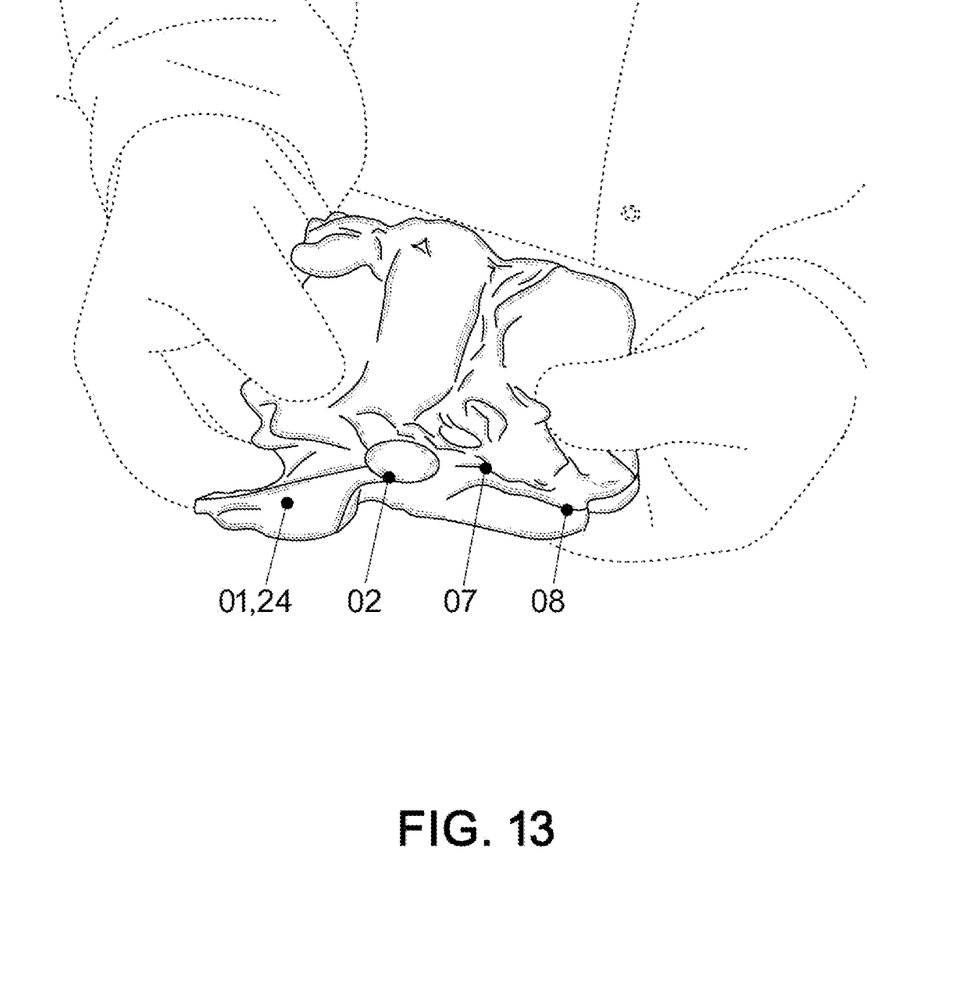
FIG. 13 the center-cut bone in a turkey thigh part is displayed with the femur bone transversely sliced and held by the meat cutter (person cutting the turkey thigh), revealing the underside skinless meat portion characterized by its uneven meat texture attributed to the presence of tendons and ligaments; this center-cut bone in the turkey thigh part exemplifies the outcome of the current method, necessitating two longitudinal (vertical) cuts and two transverse (horizontal) cuts, each executed at predetermined locations using a handheld knife and a bandsaw; in accordance with an exemplary embodiment of the present invention.
Figure 14:
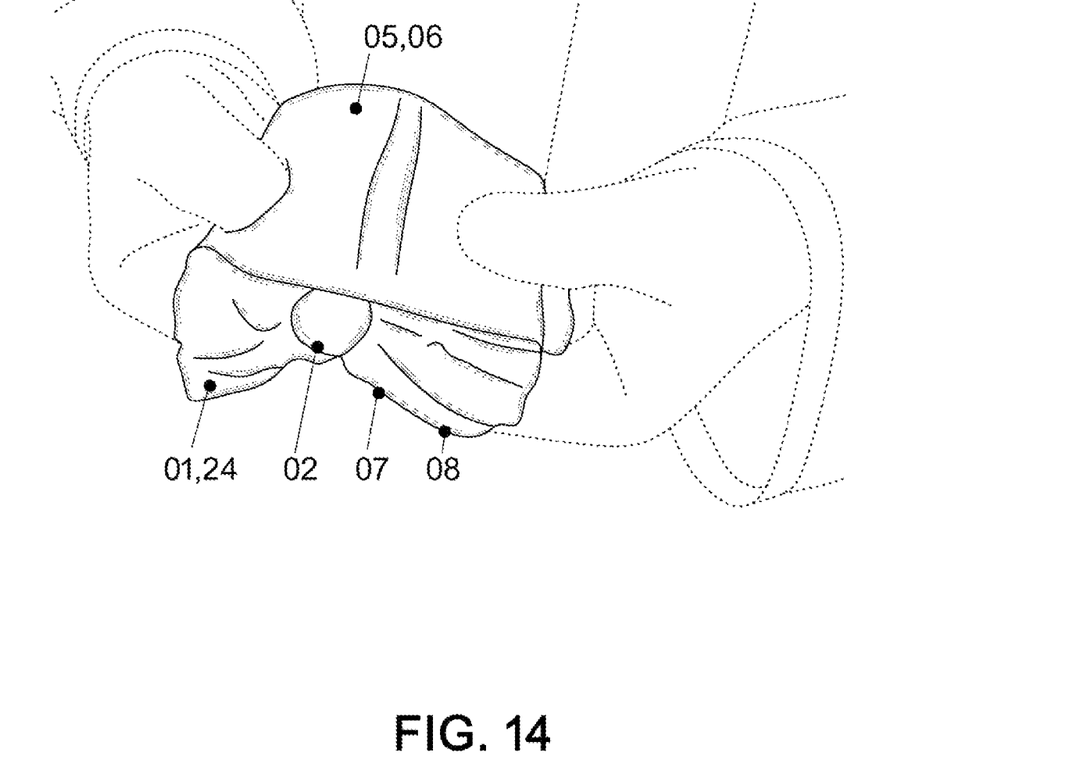
FIG. 14 shows a perspective side and top view of the center-cut bone-in turkey thigh part, with the femur bone transversely sliced, exposing primarily the top skinless meat part, distinguished by its uniform meat texture; the center-cut bone in a turkey thigh part is held by the meat cutter (person cutting the turkey thigh), offering a clear depiction of its proportions; the center-cut bone in turkey thigh part represents the end result of the current method, which requires two longitudinal (vertical) cuts and two transverse (horizontal) cuts, each made at predetermined locations utilizing a handheld knife and a bandsaw; in accordance with an exemplary embodiment of the present invention.

As illustrated in FIGS. 12-14, the center-cut bone-in turkey thigh part (24) constitutes a relatively thick portion of turkey meat containing a section of the femur bone (02), transversely cut in previous step. The center-cut bone-in turkey thigh part (24) exhibits a square appearance, featuring one side with uniform meat texture (06) and the opposite side displaying uneven meat texture (08). The center-cut bone-in turkey thigh part (34) is a distinctive element of the turkey thigh, visually resembling beef or pork ribs, with the bone nestled within tender, flavorful dark meat.

I claim:

1. A method for cutting a center-cut bone-in turkey thigh part from a turkey thigh, comprising:
   (A) providing the turkey thigh containing a femur bone severed at two ends, wherein said two ends comprise of a proximal end, and a distal end;
   (B) skinning the turkey thigh so that that a top skinless meat part of the turkey thigh is identifiable by a uniform meat texture and a bottom skinless meat part is identifiable by an uneven meat texture indicating positioning of a plurality of tendons and ligaments and the femur bone;
   (C) placing the turkey thigh onto a surface so that the plurality of tendons and ligaments including the femur bone are visually discernible to a meat cutter;
   (D) identifying a center line of the femur bone;
   (E) identifying a top line of the turkey thigh;
   (F) identifying a bottom line of the turkey thigh;
   (G) providing a cutting tool which the meat cutter can use to cut through the turkey thigh;
   (H) utilizing the cutting tool to longitudinally, parallel to, left to, and at a predetermined distance from the center line make a first cut through the turkey thigh thereby creating a left boneless turkey thigh part;
   (I) utilizing the cutting tool to longitudinally, parallel to, right to, and at a predetermined distance from the center line make a second cut through the turkey thigh thereby creating a right boneless turkey thigh part;
   (J) utilizing the cutting tool to transversely and at a predetermined distance from the top line make a third cut through the turkey thigh thereby creating a top turkey thigh part; and
   (K) utilizing the cutting tool to transversely and at a predetermined distance from the bottom line make a fourth cut through the turkey thigh thereby creating a bottom turkey thigh part and the center-cut bone-in turkey thigh part.

2. The method for cutting the center-cut bone-in turkey thigh part from the turkey thigh of claim 1, wherein: said proximal end is connecting to a hip bone thereby forming a hip joint.

3. The method for cutting the center-cut bone-in turkey thigh part from the turkey thigh of claim 1, wherein: said distal end is connecting to a fibula bone thereby forming a knee joint.

4. The method for cutting the center-cut bone-in turkey thigh part from the turkey thigh of claim 1, wherein: said turkey thigh is placed onto the surface such that the top skinless meat part makes contact with the surface.

5. The method for cutting the center-cut bone-in turkey thigh part from the turkey thigh of claim 1, wherein: said surface is a meat cutting board.

6. The method for cutting the center-cut bone-in turkey thigh part from the turkey thigh of claim 1, wherein: said cutting tool is a knife configured to be manually operable by the meat cutter.

7. The method for cutting the center-cut bone-in turkey thigh part from the turkey thigh of claim 1, wherein: said cutting tool is an automated knife configured to be controlled by the meat cutter.

8. The method for cutting the center-cut bone-in turkey thigh part from the turkey thigh of claim 1, wherein: said cutting tool is a band saw.

9. The method for cutting the center-cut bone-in turkey thigh part from the turkey thigh of claim 1, wherein: said cutting tool are scissors.

10. The method for cutting the center-cut bone-in turkey thigh part from the turkey thigh of claim 1, wherein: said predetermined distance of the first cut left from the center line creating the left boneless turkey thigh part is 2 to 2½ inches.

11. The method for cutting the center-cut bone-in turkey thigh part from the turkey thigh of claim 1, wherein: said predetermined distance of the second cut right from the center line creating the right boneless turkey thigh part is 2 to 2½ inches.

12. The method for cutting the center-cut bone-in turkey thigh part from the turkey thigh of claim 1, wherein: said predetermined distance of the third cut from the top line creating the top turkey thigh part is 1 to 2 inches.

13. The method for cutting the center-cut bone-in turkey thigh part from the turkey thigh of claim 1, wherein: said predetermined distance of the fourth cut from the bottom line creating the bottom turkey thigh part is 1 to 2 inches.

14. A method for cutting the center-cut bone-in turkey thigh part from the turkey thigh of claim 1, wherein: the meat cutter selects the predetermined distance at which the third cut is made to ensure that the proximal end is entirely located in the top turkey thigh part.

15. A method for cutting the center-cut bone-in turkey thigh part from the turkey thigh of claim 1, wherein: the meat cutter selects the predetermined distance at which the fourth cut is made to ensure that the distal end is entirely located in the bottom turkey thigh part;

whereby following the creation of the left boneless turkey thigh part, the right boneless turkey thigh part, the top turkey thigh part, and the bottom turkey thigh part, the remaining meat portion constitutes the center-cut bone-in turkey thigh part.

\* \* \* \* \*